April 3, 1956 — W. G. WEATHERLY — 2,740,660
PROTECTIVE COVERING FOR LOADED VEHICLES
Filed June 15, 1953 — 2 Sheets-Sheet 1
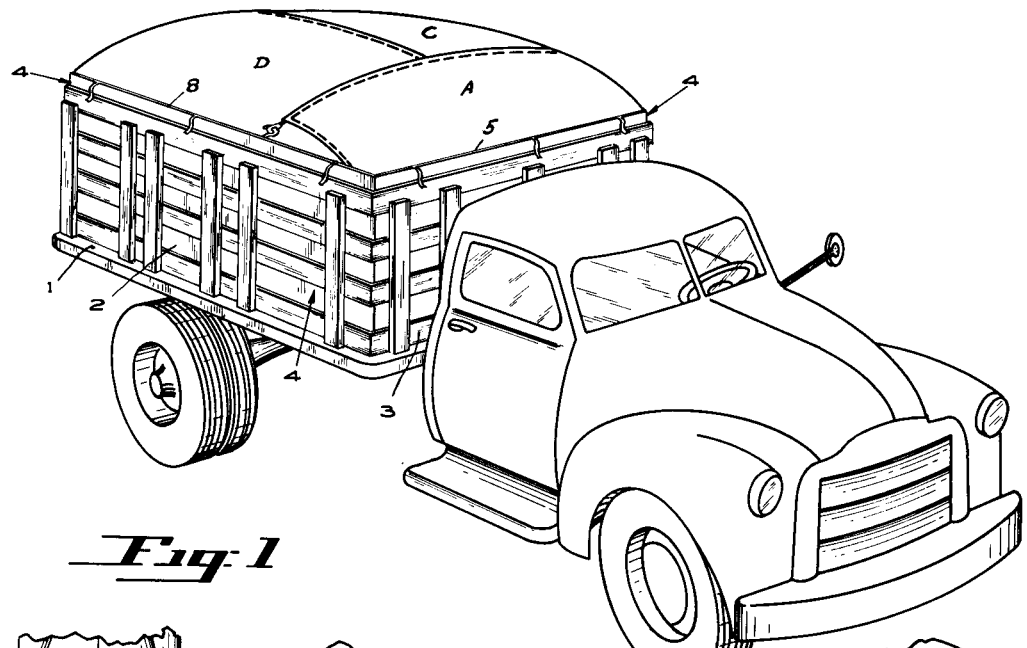
Fig. 1
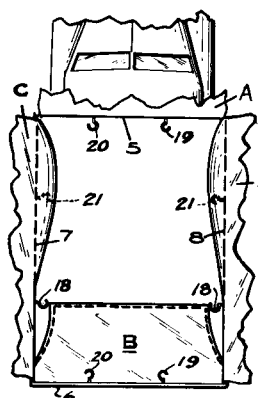
Fig. 2
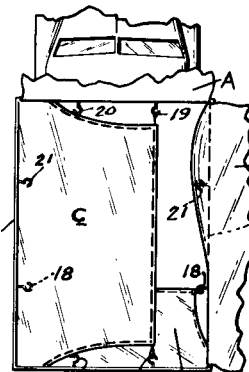
Fig. 3
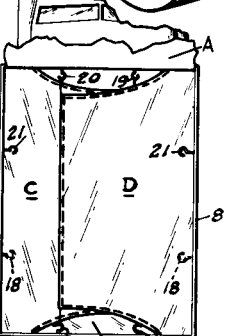
Fig. 4
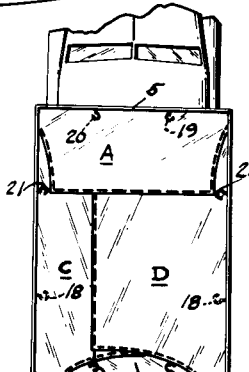
Fig. 5
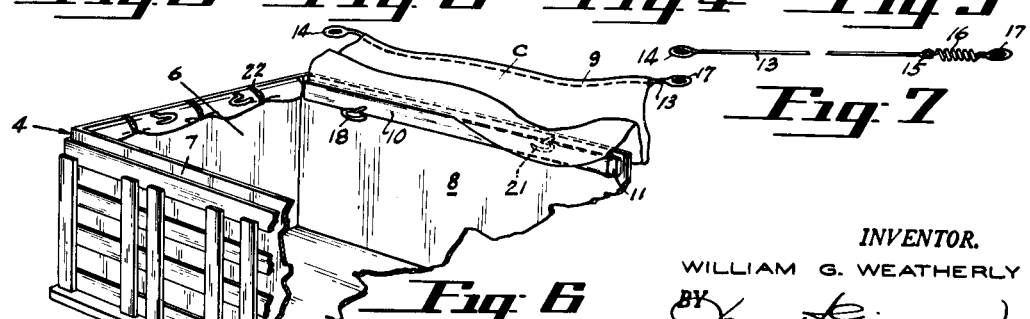
Fig. 6 — Fig. 7
INVENTOR.
WILLIAM G. WEATHERLY
BY James Girnan
ATT'Y April 3, 1956      W. G. WEATHERLY      2,740,660
PROTECTIVE COVERING FOR LOADED VEHICLES
Filed June 15, 1953      2 Sheets-Sheet 2

WILLIAM G. WEATHERLY
INVENTOR.

BY James L. Girnan
ATTY

United States Patent Office 2,740,660
Patented Apr. 3, 1956

2,740,660

PROTECTIVE COVERING FOR LOADED VEHICLES

William G. Weatherly, Clarkston, Wash.

Application June 15, 1953, Serial No. 361,465

1 Claim. (Cl. 296—100)

This invention relates to improvements in truck bodies and more particularly to the bodies of trucks designed for hauling grain, sawdust, or any other light weight comminuted material.

It is one of the principal objects of the invention to provide a truck body of this character with a protective covering for the top of the load to protect it against a strong wind from any direction or the stream of air passing over the truck in motion to prevent loose particles of the load from being blown out of the truck body and scattered along the roadway.

Another object is the provision of a protective covering of the character described made of four individual flaps which may be quickly and conveniently unrolled from the ends and sides of the truck body and overlapped over the load and secured in place by yieldable cords which will conform to the contour of the load.

These and other objects will appear as my invention is more fully hereinafter described in the following specification, illustrated in the accompanying drawings and finally pointed out in the appended claim.

In the drawings:

Figure 1 is a perspective view of a dump-truck showing a protective covering made in accordance with my invention applied to the body of the truck.

Figures 2, 3, 4, and 5 are diagrammatic top plan views of the truck body showing various folding operations of the elements of the protective covering.

Figure 6 is a fragmentary perspective view of the truck body showing two elements of the protective covering in two different positions.

Figure 7 is a detail view of a fastening cord.

Figure 8:
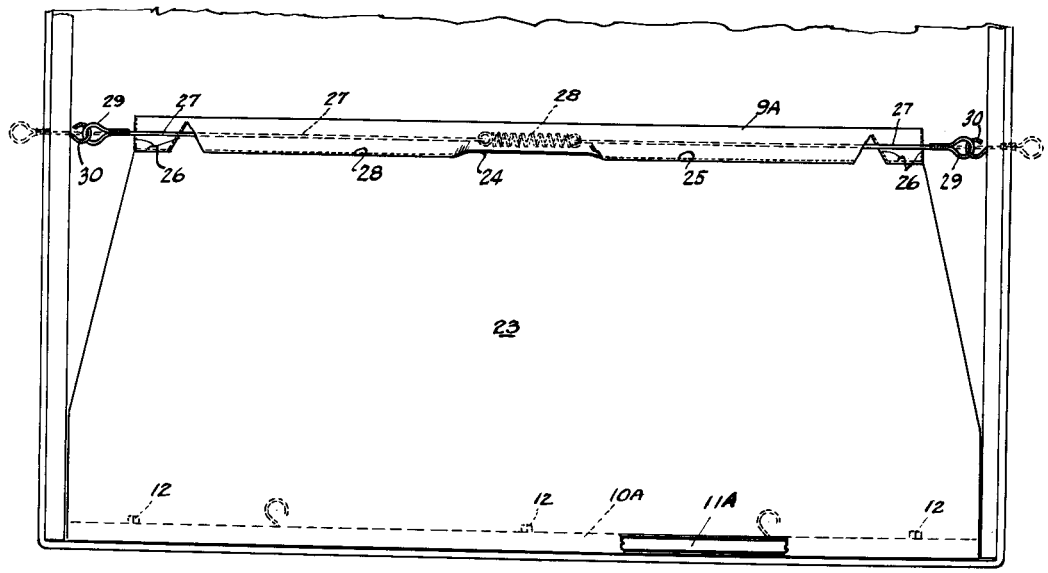
Figure 8 is a fragmentary top plan view of a truck body showing a modified form of fastening cord disposed within a modified form of hem along the inner marginal edge of one of the elements of the covering.

Referring now more particularly to the drawings.

In Figure 1, reference numeral 1 indicates the floor of a truck body which may or may not be provided with the removable sectional side and end walls 2 and 3 respectively. Mounted upon the floor 1 by any suitable means or removably mounted thereon within the confines of said side and end walls is a tank generally indicated at 4 of box formation having a front wall 5, rear wall or tailgate 6 and side walls 7 and 8.

The protective covering is made up of four individual elements in the form of flaps indicated at A, B, C, and D representing front, rear and side flaps, respectively, adapted to be folded over onto themselves progressively as illustrated in Figures 2, 3, 4 and 5 wherein the rear flap B is first folded forwardly and overlapped by the side flap C which is then overlapped by side flap D. The forward flap A is then folded rearwardly to overlap flaps B and C. Since all of the flaps are identical, a description of one will suffice for all. As best illustrated in Figure 6, the side marginal edges of the flap are folded back on themselves and stitched throughout their length to form tubular hems 9 and 10.

Each flap is secured to its respective side or end wall of the truck body by means of a beam 11 disposed within the hem 10 and secured to the wall of the truck body by means of bolts 12. Through the other hem 9 I extend a fastening element in the form of a cord 13 formed into a loop 14 at one of its ends and connected as at 15 at its opposite end to one end of a tension spring 16 whose opposite end is formed into a loop or eye 17. If desired, the tension spring 16 could be dispensed with by substituting rubber shock cord looped at both of its ends.

As best illustrated in Figures 2, 3, 4 and 5, the looped ends of either form of fastening element above described, when used with the flap B, are adapted for attachment to transversely aligned hooks 18 secured either to the walls of the truck body or to said beams which extend through the tubular hem 10. With the flap B in this position, the flap C is folded inwardly into a position where the looped ends of its fastening cord can be engaged with forwardly and rearwardly aligned hooks 19. The fastening cord of the flap D when the flap is folded inwardly is engageable with another pair of forwardly and rearwardly aligned hooks 20. Following this the forward flap A is folded rearwardly to overlap flaps C and D and its fastening cord is then attached to another pair of transversely aligned hooks 21.

For convenience in attaching the fastening cords of the various flaps to their respective hooks, I place the hooks 18 beneath the rear portions of the flaps C and D and the hooks 21 above the forward portions of said flaps. The two rearward hooks of the two pairs 19 and 20 are placed above the line of attachment of the flap B to the truck body and the two forward hooks of said pairs are placed below the line of attachment of the flap A.

When not in use, each flap may be rolled up and held in an out of the way position by means of straps 22. Each flap is tapered inwardly toward its outer hem 9 to provide space for conveniently manipulating the ends of the fastening cords into and out of engagement with their respective hooks.

In the modified form of the invention illustrated in Figure 8, the flap 23 is secured to its respective wall in the same manner as the flaps just described by means of a beam 11A disposed within the hem 10A and bolted as at 12 to the wall of the body of the truck.

The opposite hem 9A is of tubular formation substantially throughout its length except for a central opening or pocket 24 formed by a gap in the line of stitching 25 which forms the hem. The end portions of the hem are flattened by lines of stitching 26. The fastening element extending through and beyond this modified form of hem comprises two cords 27 connected at their inner ends to the ends of a tension spring 28 normally disposed within the pocket 24 in the hem. The opposite or outer ends of the cords 27 are formed into loops 29 for attachment to hooks 30 secured to the walls of the truck body as heretofore described. The spring 28 renders the cords 27 expansible as indicated in dotted lines to truck bodies of various lengths and widths.

Figure 9:
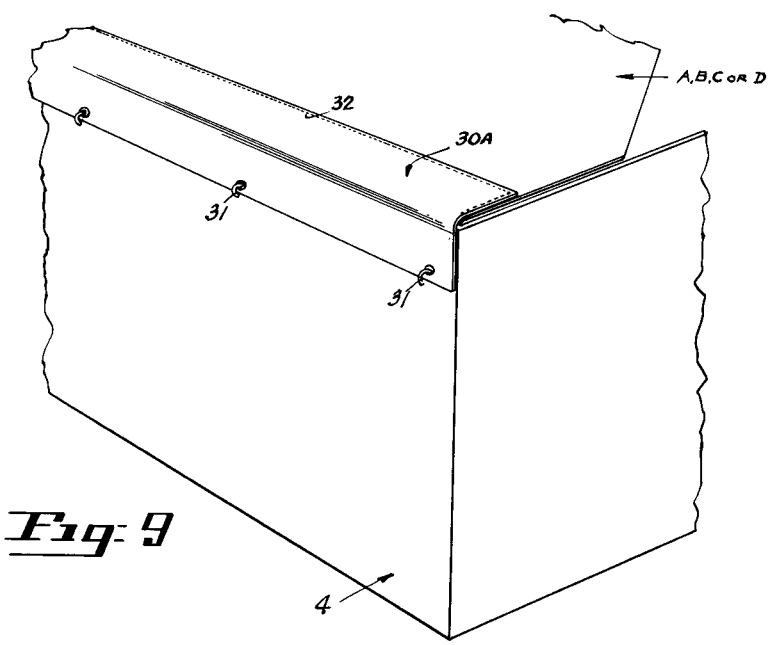
Figure 9 is a fragmentary perspective view of an auxiliary cover for the outside edge of each flap.

In Figure 9, I have shown an auxiliary cover 30A for the outside edge of each main flap. The cover consists of a strip of heavy fabric such as canvas, or the like, removably attached by means of hooks 31 to its respective wall of the truck and permanently secured to its respective flap by stitching 32. When all of the main flaps A, B, C, and D are folded over onto themselves and secured in place by means of their fastening cords and aligned hooks as aforesaid, the free marginal portions of the auxiliary covers are drawn downwardly and attached to the hooks 31 to prevent rain water from accumulating along the outside edges of the main flap and the possibility of it seeping downwardly between the main flap and the wall of the truck and into the load carried within the truck body.

While I have shown particular forms of embodiment of my invention, I am aware that many minor changes therein will readily suggest themselves to others skilled in the art without departing from the spirit and scope of the invention. Having thus described my invention, what I claim as new and desire to protect by Letters Patent is:

A load-protecting cover for a truck body having front rear and side walls, comprising in combination two pairs of forwardly and rearwardly aligned hooks secured to and extending inwardly from said front and rear walls respectively, two pairs of transversely aligned hooks secured to and extending inwardly from the side walls of the truck body, forward and rearward flaps attached throughout the length of one of their edges to said front and rear walls respectively, a hem formed throughout the length of the opposite edge of each of said flaps, a resilient fastening cord extending through each of said hems and terminating in a loop at both of its ends whereby the fastening cord of the rear flap when folded inwardly with respect to the truck body will be engageable with one pair of said transversely aligned hooks and whereby the fastening cords of said side flaps will be engageable with one pair of said forwardly and rearwardly aligned hooks when said side flaps are overlapping and whereby the fastening cord of said forward flap will be engageable with the other pair of said transversely aligned hooks when said forward flap is overlapping said side flaps, an auxiliary cover for the outside portion of each of said flaps, each auxiliary cover comprising a strip of flexible material secured throughout the length of one of its edges and across a portion of its ends to its respective flap, the opposite edge of each auxiliary cover having spaced-apart openings therein for attachment to spaced-apart hooks secured to and extending outwardly from the walls of the truck body.

References Cited in the file of this patent

UNITED STATES PATENTS

| | | |
|---|---|---|
| 894,759 | Stevens | July 28, 1908 |
| 900,350 | Brooks | Oct. 6, 1908 |
| 975,128 | Gordon | Nov. 8, 1910 |
| 1,031,206 | Sowers | July 2, 1912 |
| 1,186,883 | DeClark | June 13, 1916 |
| 1,613,270 | Glover | Jan. 4, 1927 |
| 2,465,621 | Wheeler | Mar. 29, 1949 |

FOREIGN PATENTS

| | | |
|---|---|---|
| 4,507 | Great Britain | Mar. 2, 1895 |